3,338,877
COPOLYMERS OF ETHYLENE/STILBENE

William S. Anderson, Oakland, Calif., assignor to Shell Oil Company, New York, N.Y., a corporation of Delaware
No Drawing. Original application Dec. 9, 1963, Ser. No. 329,295. Divided and this application May 31, 1966, Ser. No. 553,676
6 Claims. (Cl. 260—88.2)

ABSTRACT OF THE DISCLOSURE

Copolymers of ethylene and stilbene which are useful as lubricating oil additives are obtained by copolymerization thereof under high pressures in the presence of an organo lithium catalyst and in the presence of a solvent mixture consisting of an aromatic hydrocarbon and a polar-containing compound.

---

This patent application is a division of patent application Ser. No. 329,295, filed Dec. 9, 1963, now Patent No. 3,282,845, issued Nov. 1, 1966.

This invention relates to new and novel copolymers of ethylene and stilbene and derivatives thereof for use as multi-functional materials and in compositions of matter.

It is known that individually stilbene or ethylene can be polymerized to form various products and articles of manufacture. Polymers of stilbene are rather low molecular weight materials which are rather thermally unstable and difficult to work with. Also, its use as additives in lubricants, rubber, coating materials is limited because of solubility and compatibility with these materials and compositions.

It has now been discovered that an excellent oxidatively and thermally stable high molecular polymer can be obtained by copolymerizing ethylene with stilbene under particular controlled conditions. These conditions are: (1) reacting the two monomers in the mol ratio of 1:10 to 10:1 preferably 2:1 to 5:1 of ethylene to stilbene, (2) under high pressure of from 5,000 p.s.i. to 100,000 p.s.i., (3) at between −40° C. and 50° C., preferably between −20° C. and 25° C., (4) in the presence of solvent mixtures of certain oxygen-containing or nitrogen-containing compounds and hydrocarbons, and (5) in the presence of an organo lithium catalyst such as an alkyl or aryl lithium compound. The copolymers of this invention have a plurality of units represented by the formula:

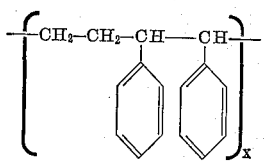

where $x$ is an integer so that the total units making up of copolymer ranges in molecular weight of from about 1000 to about 1,000,000, preferably between 2500 and 600,000 as determined by the light scattering method and the intrinsic viscosity ranging from 0.15 to 2, preferably between 0.1 and 1.5 dl./gram.

The new and novel copolymers of the present invention are prepared by copolymerizing stilbene and ethylene in the presence of a suitable solvent and an organo lithium catalyst at a temperature range from about −50° C. to 50° C. and at a pressure between 5,000 p.s.i. and 100,000 p.s.i.

By suitable liquid solvent mixtures made reference to in column 1, item (4) is meant mixture of from 10% to 90% of certain oxygen-containing compounds such as dimethyl ether, diethyl ether, dioxane, diethyl ether of diethylene glycol, tetrahydrofuran, diphenylene oxide, or nitrogen compounds such as triethylamine or triethylenediamine or sulfur-containing compounds such as diethyl sulfide, tetrahydrothiophene, etc., and from 90% to 10% of an aromatic hydrocarbon such as benzene or toluene or the like.

The catalyst may be an organo lithium such as an alkyl or aryl lithium compound, e.g., ethyl or normal or branched butyl, octyl lithium or phenyl or naphthyl lithium or mixtures thereof. The catalyst may also be a dilithio compound such as the lithium adduct of 1,1-diphenyl ethylene, or of stilbene or of alpha-methyl styrene or may also be an aliphatic dilithio compound such as 1,5-dilithio pentane, 1,6-dilithio hexane, etc.

When other types of catalysts such as the Friedel-Crafts catalyst or Ziegler type catalysts or other alkali metal catalysts, e.g., sodium or mixtures thereof with or without the presence of the above-mentioned solvents and under different pressure and temperature conditions from that of the present invention results in a different end product from the one made by the process of the present invention. Particular advantages of the polymer of the present invention is their rigidity and high impact strength. The following examples are illustrative of the present invention.

Example I

A mixture of about 1 part of stilbene and 5 parts ethylene were introduced into a pressure vessel containing about a 50–50 mixture of tetrahydrofuran and toluene. The entire mixture is reacted under pressure of 11,800–6,600 p.s.i. and at a temperature of around 0° C.–5° C. in the presence of 0.01 mole butyl lithium catalyst for 1–24 hours, until the copolymer reaction indicated the stilbene content to be essentially unchanged. The stilbene content of the copolymer was around 20–30% and the molecular weight of the copolymer was between 10,000 and 100,000.

Following essentially the above procedure other copolymers of the present invention were prepared as shown in Table I.

TABLE I

| Example* | Stilbene, Mol percent | Ethylene, Mol percent | Reaction Temp., °C. | Reaction Pressure | Reaction Time, Hr. | Mol wt. (Ebul.) |
|---|---|---|---|---|---|---|
| II | 35 | 65 | 0 to +5 | 11,800-6,600 | 10 | 5,000 |
| III | 25 | 75 | 10-15 | 13,700-9,400 | 5 | 2,500 |
| IV | 75 | 25 | 10-20 | 13,500-9,200 | 24 | 4,800 |
| V | 30 | 70 | 0-10 | 15,000-1,000 | 24 | 10,000 |

*II Solvent=50/50 mixture of tetrahydrofuran and tolune, Catalyst=Butyl lithium (0.1%).
III Solvent=10/10 mixture of tetrahydrofuran and benzene, Catalyst=Butyl lithium (0.1%).
IV Solvent=50/20 mixture of tetrahydrofuran and benzene, Catalyst=Butyl lithium (0.1%).
V Solvent=50/50 mixture of diethyl ether and toluene, Catalyst=lithium naphthene (0.1%).

Although the oil-solubility of these copolymers are marginal, their solubility and lubricating oil additive properties can be greatly improved by alkylation of the copolymer so as to introduce long alkyl radicals having from 10 to over 30 carbon atoms. Alkylation of the copolymer can be accomplished by reacting the copolymer in a suitable solvent such as alkyl halides, e.g., ethyl chloride; nitroaromatics, e.g., nitrobenzene or carbon disulfide and the like, with long-chain olefins such as polyisobutylene, or $C_{10-30}$ alkyl halides or acetyl halides such as lauryl, oleyl, stearyl chlorides and the like. The reaction can be carried out at from $-50°$ C. to $20°$ C. and the reaction time varies from 1 to 24 hours.

For example, the polymer of Example III was added to nitrobenzene, agitated and 20% of polyisobutylene (m.w. 1500) slowly added thereto and the temperature maintained at $-10$ to $-20°$ C. for about 5 hours. The end product (Ex. IIIA) contained units represented by the formulas:

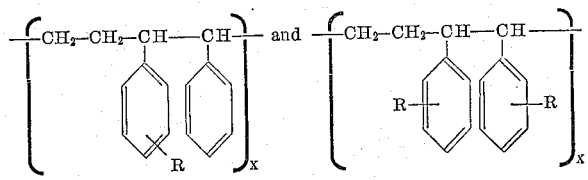

wherein R is a polyisobutenyl radical.

Another way of increasing oil solubility is to hydrogenate the copolymer and this can be accomplished by dissolving the copolymer, e.g., Ex. I-V in a hydrocarbon solvent such as cyclohexane and hydrogenating the copolymer at $125-200°$ C. and 500–1000 p.s.i. in the presence of a suitable catalyst such as platinum.

For example, the copolymer of Ex. I was dissolved in cyclohexane and hydrogenated at $150-175°$ C., and 500–800 p.s.i. pressure in the presence of platinum catalyst for about 5–10 hours. About 60–75% of the aromatic units in polymer were hydrogenated. The hydrogenated copolymer (Ex. IA) was soluble in mineral oil to $-20°$ C. and lower whereas the unhydrogenated polymer was not soluble at these low temperatures. The hydrogenated copolymer imparts pour point and viscosity index (VI) improving properties to mineral lubricating oil. Thus, a mineral lubricating oil having a pour point of $+20$ and a VI of 50 was improved by addition thereto to 5% of hydrogenated copolymer (Ex. IA) so that the oil composition has a pour point of $-20°$ C. and a VI of 110.

When desired, additional improvements with respect to oxidation stability and scuffing inhibition can be imparted to the oil compositions containing the copolymers of this invention by incorporating small amounts (0.01%–2%, preferably 0.1%–1%) of phenolic antioxidants such as alkylphenols, e.g., 2,6-ditertbutyl-4-methylphenol or p,p'-methylene bisphenols such as 4,4'-methylene bis(2,6-ditertbutyl phenol) or arylamines such as phenylalphanaphthylamine, dialkyl sulfides and mixtures thereof, e.g., dibenzyl disulfide, didodecyl sulfide. Anti-scuffing agents include organic phosphites, phosphates, phosphonates and their thio derivatives, such as $C_{3-18}$ alkyl phosphites, or phosphonates, e.g., di- and tributyl, octyl, lauryl, stearyl, cyclohexyl, benzyl, cresyl, phenyl, phosphites or phosphates, as well as their thio derivatives, $P_2S_5$-terpene reaction products, e.g., $P_2S_5$-pine oil reaction product and alkali metal salts thereof such as a potassium salt of a $P_2S_5$-terpene reaction product, phosphonates such as dibutyl methanephosphonate, dibutyl trichloromethanephosphonate, dibutyl monochloromethanephosphonate, di-butyl chlorobenzenephosphonate, and the like. The full esters of pentavalent phosphorus acids such as triphenyl, tricresyl, trilauryl and tristearyl ortho-phosphates or potassium salt of $P_2S_5$-terpene reaction product are preferred.

The polymeric additives of this invention improve various mineral oil products by the incorporation of a minor amount (0.01% to 5%, preferably 0.1% to 3% by weight) of the additive. Thus, they may be used to improve transformer oils, turbine oils, hydraulic fluids, mineral lubricating oils, industrial oils and the like. Suitably such lubricating oils range from SAE 5W viscosity grade to SAE 140 grade and are derived from paraffinic, naphthenic or asphaltic base crudes. Representative oils are refined high viscosity index mineral oils having a viscosity at $100°$ C. of from 100 to 250 SUS.

Copolymers of the present invention possess excellent thermal stability properties.

Copolymers of the present invention are compatible with waxes, rubber (natural and synthetic), moldable resins, ion exchange resins and can be used in radiation resistant oil, greases, plastics, dielectrics, optical goods, synthetic leather, drilling muds, lubricants and the like.

I claim as my invention:

1. A copolymer of ethylene and stilbene containing a plurality of units of the formula

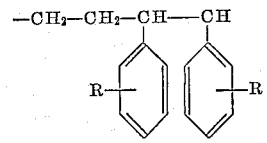

wherein R is a $C_{10}$ to $C_{30}$ alkyl radical, hydrogen, or a polyisobutenyl radical and having a molecular weight of from about 1000 to about 1,000,000.

2. The copolymer of claim 1 wherein R is hydrogen.

3. The copolymer of claim 1 wherein one R in each of the plurality of units is a polyisobutenyl radical and the remaining R is a polyisobutenyl radical or hydrogen.

4. A process for preparing a copolymer of ethylene and stilbene having a molecular weight of from about 1000 to about 1,000,000 which comprises reacting ethylene and stilbene in a mole ratio of from 1:10 to 10.1 at a tempreature of from $-40°$ C. to $50°$ C. and at a pressure of from 5,000 to 100,000 p.s.i. in the presence of an organo lithium catalyst and a solvent mixture comprising an aromatic hydrocarbon and a compound selected from the group consisting of dimethyl ether, diethyl ether, dioxane, diethyl ether of diethylene glycol, tetrahydrofuran, diphenylene oxide, triethylene amine, triethylenediamine, diethyl sulfide and tetrahydrothiophene.

5. The process of claim 2 wherein the catalyst is butyl lithium and the solvent mixture consists of equal amounts of tetrahydrofuran and toluene.

6. The copolymer of claim 3 wherein both R's are polyisobutenyl radicals.

No references cited.

J. L. SCHOFER, *Primary Examiner.*

M. B. KURTZMAN, *Assistant Examiner.*